(12) United States Patent  
Mahe et al.

(10) Patent No.: US 9,597,823 B2  
(45) Date of Patent: Mar. 21, 2017

(54) INSERTION BLOCK FOR THE FORMATION OF A HOOK FIELD ON AN INJECTION-MOULDED OBJECT, AND A MOULDED OBJECT COMPRISING A HOOK FIELD OF THIS TYPE

(71) Applicant: APLIX, Paris (FR)

(72) Inventors: Antony Mahe, Saint Julien de Concelles (FR); Quresh Sachee, Charlotte, NC (US)

(73) Assignee: APLIX, Paris (FR)

( * ) Notice: Subject to any disclaimer, the term of this patent is extended or adjusted under 35 U.S.C. 154(b) by 801 days.

(21) Appl. No.: 14/012,610

(22) Filed: Aug. 28, 2013

(65) Prior Publication Data

US 2013/0344191 A1    Dec. 26, 2013

Related U.S. Application Data

(62) Division of application No. 12/287,767, filed on Oct. 14, 2008, now Pat. No. 8,522,407.

(30) Foreign Application Priority Data

Oct. 26, 2007   (FR) ...................................... 07 07533

(51) Int. Cl.
    *B29C 33/42*      (2006.01)  
    *A44B 18/00*      (2006.01)  
    (Continued)

(52) U.S. Cl.  
    CPC .......... *B29C 33/42* (2013.01); *A44B 18/0049* (2013.01); *A44B 18/0061* (2013.01);  
    (Continued)

(58) Field of Classification Search  
    CPC ..... B29C 33/42; B29C 33/10; B29C 45/2673; B29C 33/302; B29C 45/34; B29C 33/306;  
    (Continued)

(56) References Cited

U.S. PATENT DOCUMENTS

| 5,656,226 A | * | 8/1997 | McVicker | .......... | A44B 18/0049 |
| | | | | | 24/452 |
| 7,411,204 B2 | * | 8/2008 | Appleby | ............... | B29C 33/302 |
| | | | | | 250/505.1 |

* cited by examiner

*Primary Examiner* — Robert J Grun  
(74) *Attorney, Agent, or Firm* — Renner, Kenner, Greive, Bobak, Taylor & Weber

(57) ABSTRACT

Object molded in thermoplastic material in any shape having an outer surface from which protrudes at least one hook in one piece with the molded object, in particular a hook field, the molded object and the hook(s) having been formed by injection molding, each hook comprising a base part and a head or hooking part protruding from the base part and being delimited by first and second lateral surfaces each extending on the outer surface of the molded object, being separated from each other by an intermediate surface forming the edge of the hook, the curve sections, defined by the intersections of at least one of the first and/or second lateral surfaces with planes which are in parallel with the base plane from which the hook protrudes and which are at given distances h from this base plane, have a curvature which varies as a function of the distance h, the curvature of the curve section for h=0 (the base plane and said parallel plane merging) being greater than the curvature of at least one curve section for a distance h substantially corresponding to a level of the head of the hook.

8 Claims, 3 Drawing Sheets

(51) Int. Cl.
  *B29C 33/10* (2006.01)
  *B29C 33/30* (2006.01)
  *B29C 33/38* (2006.01)
  *B29C 45/26* (2006.01)
  *B29C 45/34* (2006.01)
  *B29L 31/00* (2006.01)

(52) U.S. Cl.
  CPC ............ *B29C 33/10* (2013.01); *B29C 33/302* (2013.01); *B29C 33/306* (2013.01); *B29C 33/3842* (2013.01); *B29C 45/2673* (2013.01); *B29C 45/34* (2013.01); *B29C 2033/385* (2013.01); *B29L 2031/729* (2013.01); *Y10T 24/2792* (2015.01); *Y10T 428/24017* (2015.01)

(58) Field of Classification Search
  CPC .......... B29C 33/3842; B29C 2033/385; A44B 18/0061; A44B 18/0049; Y10T 24/2792; Y10T 428/24017; B29L 2031/729
  See application file for complete search history.

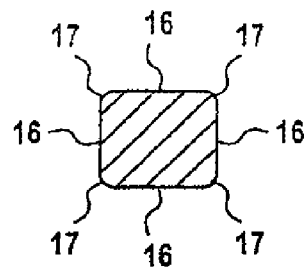 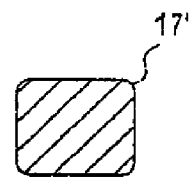
FIG.6  FIG.7
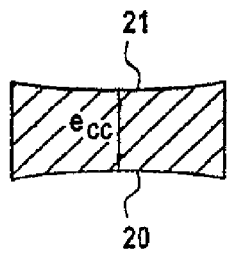 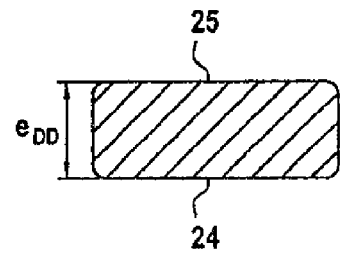 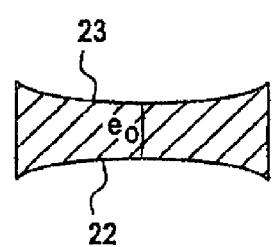
FIG.8  FIG.9  FIG.10
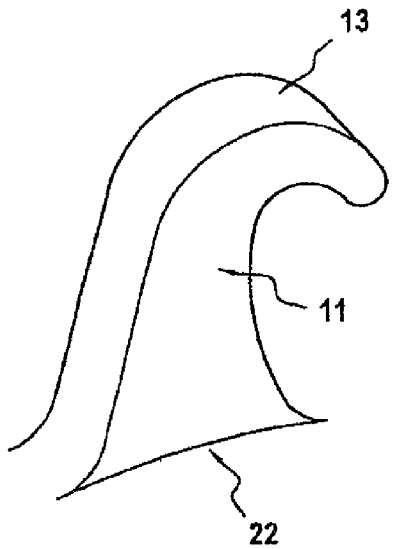 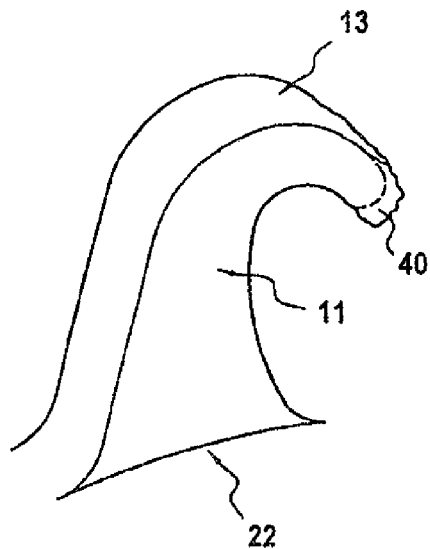
FIG.11  FIG.12

INSERTION BLOCK FOR THE FORMATION OF A HOOK FIELD ON AN INJECTION-MOULDED OBJECT, AND A MOULDED OBJECT COMPRISING A HOOK FIELD OF THIS TYPE

CROSS-REFERENCE TO RELATED APPLICATION

This application is a division of U.S. patent application Ser. No. 12/287,767 filed on Oct. 14, 2008, which is incorporated herein by reference in its entirety.

TECHNICAL FIELD

The present invention relates to a moulding insertion block intended to be placed in a mould for forming a moulded object, the block being intended to form a hook field in one piece with the moulded object. The present invention also relates to a moulded object comprising a hook field produced in one piece with the moulded object.

BACKGROUND ART

When an object of any shape is moulded, in particular by injection, and a hook field is desired to be provided thereon which will enable the object to be attached, for example via loops of a woven material or other hooks which co-operate with the hook field, an insertion block is made beforehand which is intended to be inserted in the mould for producing the moulded object and comprises in general a field of cavities issuing at its upper surface and having a shape complementary to that of the hooks of the hook field to be formed. This insertion block is then disposed in the mould in which the moulded object will be moulded, the hooks thus being formed at the same time as the moulded object and in one piece therewith.

The insertion blocks known nowadays are formed of plates stacked one against the other, and on the upper edge or field of some of these plates, cut-outs having a shape complementary to that of the hooks are formed, by machining e.g., by spark-machining, laser etching, chemical cutting or the like. The stacked plates are generally formed of two types of plates, i.e., plates whose fields have cut-outs and plates without cut-outs—these latter plates being disposed between two plates with cut-outs to thereby form the cavities, each cavity being formed of one cut-out and the lateral walls of the adjoining plates without cut-outs. However, plates can also be stacked all having cut-outs on their field, by offsetting the cut-outs formed in two successive plates such that the part of one plate between two of its successive cut-outs forms a lateral wall of the cavities of the adjoining plates.

Once the plates are stacked one on top of the other, these are pressed together by jaw-type systems and/or are welded at the periphery thereof to keep them together, wherein a combination of these methods is also possible.

These insertion blocks of the prior art have many drawbacks:

when they are placed in the mould for forming the moulded object on which they are intended to permit the addition of the hook field, the plates which are clamped together or are welded together at their ends might slightly separate from each other under the effect of the injection pressure of the thermoplastic material allowing the passage of the thermoplastic material between two successive plates. Upon exiting the mould, the hook field formed on the moulded object thus has a burr formed by a sort of wall, often with a greater height than the hooks and extending over substantially the entire width of the hook field, wherein this burr might make the hook field unusable or at least non-compliant for fixation to, for example, another hook field or to loops of a woven material. This also makes the moulded object as a whole unusable, which object must be scrapped. Furthermore, the insertion block would then have to be repaired, i.e., the process of producing the moulded object would have to be stopped and it would have to be ensured that the plates forming the insertion block are better clamped together. This, of course, results in costs in terms of time, personnel and productivity.

On the other hand, these insert blocks of the prior art make it difficult, owing to the need to clamp and keep the plates against each other, to produce inserts with a small thickness, e.g., less than 10 mm.

Furthermore, the current inserts require a device to keep the plates clamped together which means that the introduction of the insert and of this clamping/holding device into the mould requires a lot of space, resulting in particular in a used surface area which is much greater than the surface area taken up by the hook field formed by the insert.

DISCLOSURE OF THE INVENTION

The invention aims to overcome the drawbacks of the prior art by proposing an insertion block of the type mentioned above which enables the appearance of burrs in the hook field after injection moulding to be completely or at least substantially avoided. On the other hand, it is also possible to obtain inserts which are very thin, having a surface area substantially equal to that of the hook zone on the moulded object.

By attaching the plates to each other by this process, which is a piece-joining process for forming a solid piece, which does not require a liquid interface as in brazing, and which does not produce a porous connection by melting and re-solidification as in conventional fusion welding. An insertion block is obtained which is particularly resistant to the injection pressure and since there is no longer an interface between the plates, it is no longer possible for the thermoplastic material to infiltrate therein to create a burr since the plates can no longer separate from each other since they are diffusion bonded together.

By thereby providing an aeration channel, the air pushed to the bottom of the cavity by the thermoplastic material injected into the cavity is able to escape via the bottom thereof. Although the clamping force is the same, the thermoplastic material is less likely to infiltrate between the plates and to form burrs.

Preferably, the at least one channel is formed so as to communicate with the part intended to form the head of the hooks of the cavity.

In accordance with one preferred embodiment of the invention, the aeration channel(s) has/have a stepped cross-section formed by a first part having a small cross-section and a second part having a larger cross-section than the small cross-section, wherein the small cross-section is intended to effect the communication with the head part of the cavity having a shape complementary to the hooks such that air can pass into this cross-section but not thermoplastic material, and the large cross-section permits quick venting of the air which passes from the small cross-section into the large cross-section, itself in contact with the outside.

In accordance with another preferred embodiment of the invention, the cross-section of the channel(s) is flared, starting with a small dimension through which air can pass but not injected thermoplastic material and finishing with a large dimension permitting quick venting of the air.

In accordance with a preferred embodiment, the at least one auxiliary cut-out is formed in the at least one first plate.

Preferably, the second plates are plates without cut-outs.

In accordance with one possible embodiment, the second plates have at their edge at least one second plate cut-out and when the second plates are disposed against the at least one first plate, the second plate cavity is offset with respect to the cavity of the first plate such that the first plate forms a wall for the second plate cavity and the second plates each form a wall for the cavity of the first plate.

Preferably, the diameter of the equivalent cross-section of the opening for communication between the cavity and the aeration channel is less than 50 micrometers and is preferably between 10 micrometers and 40 micrometers.

The diffusion bonding of at least two plates consists of firmly assembling the plates against each other by keeping them pressed together by a connecting system on all of their surfaces. The mould is then heated, preferably under vacuum, to a temperature conventionally equal to about 0.5 to 0.8 times the melting temperature of the material of the plates. Maintaining the pressure thus results in a diffusion bond between the plates. The term "diffusion bonding" refers to the fact that under high pressure and with a temperature close to the melting temperature, the atoms diffuse between the plates and permit their respective bonding. This technique, per se, is well known and is described for example in U.S. Patent Publication No. 2005/0109821.

The present invention also relates to a object moulded in thermoplastic material in any shape having an outer surface forming a base plane from which protrudes at least one hook in one piece with the moulded object. The moulded object and the at least one hook having been formed by injection moulding, the at least one hook comprising a base part and a head or hooking part protruding from the base part, and being delimited by first and second lateral surfaces each extending on the outer surface of the moulded object being separated from each other by an intermediate surface forming the edge of the at least one hook, characterised in that the curve sections, defined by the intersections of the first and/or second lateral surfaces with the planes which are in parallel with the base plane and which are at given distances h from this base plane, having respective curvatures which vary as a function of the distance h, the curvature of the curve section for h=0 (the base plane and said parallel plane merging) being greater than the curvature of at least one curve section for a distance h substantially corresponding to a level of the head of the at least one hook.

In fact, upon fixation of the plates by diffusion bonding a high pressure is applied onto the stacked plates and this results in a deformation of the walls of the cavities formed in these plates. This results in the lateral surfaces having a concave shape, the concavity being more pronounced at the level of the base and decreasing towards the head of the hook (or towards the bottom of the cavity). In particular, at the level of the head, this concavity is substantially zero. In contrast, it is often the corners of the cross-section which become rounded based on the material pressure, viscosity conditions etc.

Preferably, the curve sections of the two first and second lateral surfaces have curvatures such that their concavities are opposed.

Preferably, at least at the level of a so-called transition part of the head, the transition between at least one of the two lateral surfaces and the intermediate surface is smooth, i.e., with no angular parts or sharp edges, in particular it is curved.

Preferably, the intermediate surface is substantially perpendicular to the two first and second lateral surfaces.

In fact, in accordance with the use of the novel insertion block in accordance with the invention, in contrast to the prior art, when the thermoplastic material enters the cavity in the form of a rod, there are no—or there are less—escape routes for the air via the lateral surfaces (and then via the interstices between the plates as in the prior art) at the level of the base of the hook such that the flow of thermoplastic material is substantially homogenous at the level of the base of the rod, or at least more homogenous than in the case of the systems of the prior art. In contrast, at the level of the head, the thermoplastic material will likely flow differently and in particular taking into account the different ventilation of the cavity. In accordance with the size and position of the aeration channel, air might remain trapped at the bottom of the cavity, thereby preventing the thermoplastic material from reaching the corners, such that the shape of the heads of the hooks after extraction thereof from the cavities does not include angular parts, like in the prior art, but in contrast includes curved parts.

In accordance with one preferred embodiment, the thickness (distance between the first and second lateral surfaces) of the transverse section (cross-section in a plane parallel to the base plane) decreases from the base of the hook towards the head.

In accordance with one preferred embodiment, a first cross-section at the level of the head of the hook has a first cross-section having at least one rounded corner having a first radius of curvature, and a second cross-section at the level of the head of the hook has a second cross-section having at least one rounded corner having a second radius of curvature, wherein the second cross-section is closer to the distal end of the head and the second radius is greater than the first radius.

In accordance with a preferred embodiment, a cross-sectional development (transversally to the two lateral surfaces and to the intermediate surface) smaller than the cross-section of the hook head protrudes from the distal end of the head of the hook. This is particularly the case when the thermoplastic material used is extremely fluid or when the opening between the moulding cavity and the aeration channels is large such that the thermoplastic material enters via this opening to protrude into the aeration channels.

In accordance with one preferred embodiment, at least one part of the development forms the so-called transition part of the head whilst the remainder of the hook in cross-section has the shape of a quadrilateral such as a square, rectangle, rhombus or the like.

In accordance with one preferred embodiment, the transition between the development and the head of the hook forms a shoulder or corner.

In the present invention, the term "smooth transition", i.e., without angular parts or sharp edges, in particular in a curved manner, refers to the fact that the curve delimiting the cross-section (i.e., transversely to the lateral surfaces and transversely to the intermediate surface) of the hook at the level of the transition, when seen under a microscope at a magnification of at least 150, is a smooth curve, in particular one whose first derivative is continuous.

BRIEF DESCRIPTION OF THE DRAWINGS

One embodiment of the invention, given solely by way of example, will now be described with reference to the drawings, in which:

FIG. 6 is a cross-sectional view taken along line A-A of FIG. 5;

FIG. 7 is a cross-sectional view taken along line B-B of FIG. 5;

FIG. 8 is a cross-sectional view taken along line C-C of FIG. 5;

FIG. 9 is a cross-sectional view taken along line D-D of FIG. 5;

FIG. 10 is a cross-sectional view in the base plane P0 of the hook;

FIG. 11 shows a perspective view of a hook of a hook field obtained using a moulding insert in accordance with another embodiment of the invention; and FIG. 12 shows a perspective view of a hook of a hook field obtained according to yet another embodiment of the invention.

PREFERRED EMBODIMENTS FOR CARRYING OUT THE INVENTION

Figure 1:
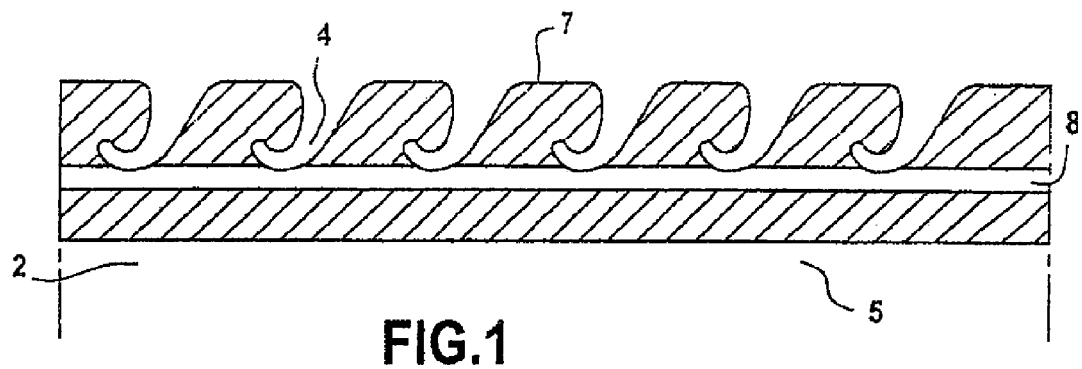
FIG. 1 is a side view of a plate of an insertion block.
Figure 2:
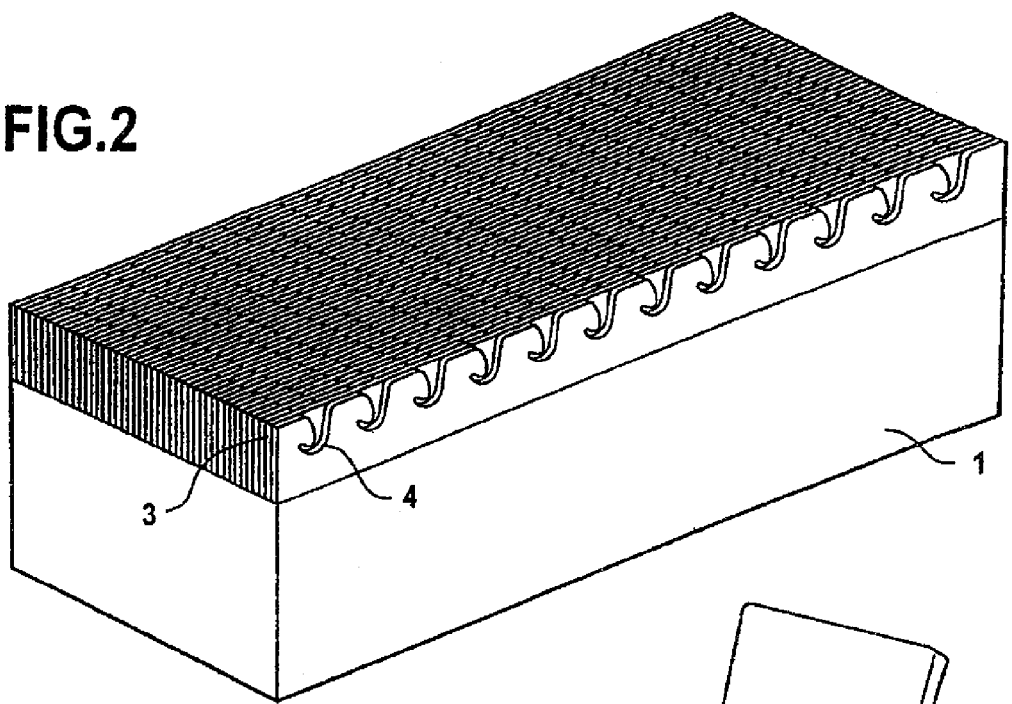
FIG. 2 is a perspective view of an insertion block in accordance with the invention formed of a stack of plates shown in FIG. 1, wherein plates without cavities have been interposed between said plates.
Figure 3A:
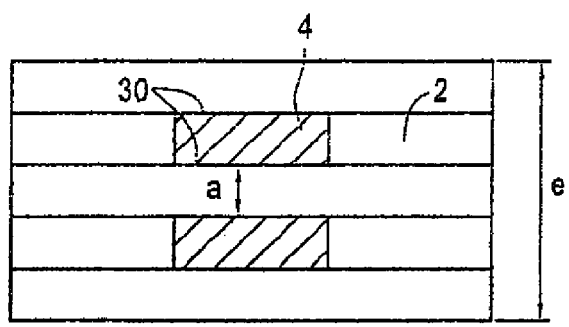
FIGS. 3A and 3B are top views of one part of the stack of plates of FIG. 2, before and after diffusion bonding respectively.
Figure 3B:
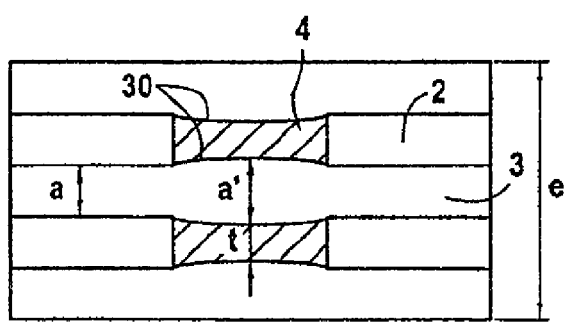

The insertion block 1 shown in FIGS. 2 and 3B is formed of an alternating stack of plates 2 having cut-outs 4 of a shape complementary to the hooks, and plates 3 not having cut-outs of a shape complementary to the shape of the hooks. The plate 2 shown in FIG. 1 is a plate having two lateral faces 5 and an upper edge or field 7 on which cut-outs 4 of a shape complementary to the hooks intended to be formed are formed by spark-machining. When this plate 2 is sandwiched between two plates 3 without cavities in the form of hooks, each cut-out 4 forms, with the walls of the adjoining plates 3, a cavity closed on the sides by two lateral, planar walls formed by the two plates 3 adjoining the plate 2 and this cavity is open at the top by an upper opening forming the base of a hook. Also formed by spark-machining, in the two lateral surfaces 5 of the plate with hooks, are two grooves 8 which will intersect the parts forming the head of the cavity having a shape complementary to that of a hook. Each groove is stepped, having a first part with a small cross-sectional dimension such that only air can pass therethrough and not thermoplastic material, and a second part with a larger cross-sectional dimension which enables the air to be vented more quickly. These stepped channels could also be formed not in the plate with hooks but in the intermediate plates without hook-shaped cut-outs, or simultaneously in the intermediate plates and in the plate with hooks.

Once the plates with cut-outs and the intermediate plates have been formed, they are firmly pressed together and diffusion bonding is performed to obtain a final block in which all of the elements are connected. A thermal processing oven can be used for example, fitted with a cylinder of a Demag press which holds the plates together by means of pressure during the cycle in which the atoms diffuse between the plates (under vacuum or in the presence of an inert gas) under the combined effect of temperature and pressure, the diffusion process permitting a connection between each adjoining plate at the atomic level to obtain in the end a block in which all of the elements are connected. At the end of this process, the plates have undergone a compression of between 0.5 and 8%, preferably between 1 and 4%, in particular about 2% and like the empty parts (the cavities were not affected by this compression) the walls 30 of the cavities 4 in the plate 2 have undergone a deformation which provides them with a camber which evens out from the base or opening towards the bottom or head of the cavity. In practice, this deformation is about 2% with respect to the initial thickness of the intermediate plate 3, but this deformation can vary between 0.5 and 8%, preferably between 1% and 4%. The camber of one of the lateral walls has its concavity directed in a direction opposite to the concavity of the camber of the other lateral wall.

The insertion block of FIG. 2 can thus be disposed in any type of mould for forming an injection-moulded object. The object shown in FIG. 4 can be made for example. A hook field corresponding to the hooks formed by the cavities of the block 1 protrudes from the moulded object and can thus permit fixation thereof. The surface over which the field extends is substantially smaller than the total surface of the moulded object, but it is also foreseeable to provide a moulded object where the majority of the surface is covered by the hook field. Upon forming the moulded object, thermoplastic material is injected into the mould in which the insertion block has been inserted beforehand substantially at the location where the hook field which will form one piece with the moulded object is intended to be formed. This thermoplastic material will enter the cavities of the insertion block and, owing to the presence of the aeration channels, will then reach the bottom of the hooks, pushing out the air into the channels.

Figure 5:
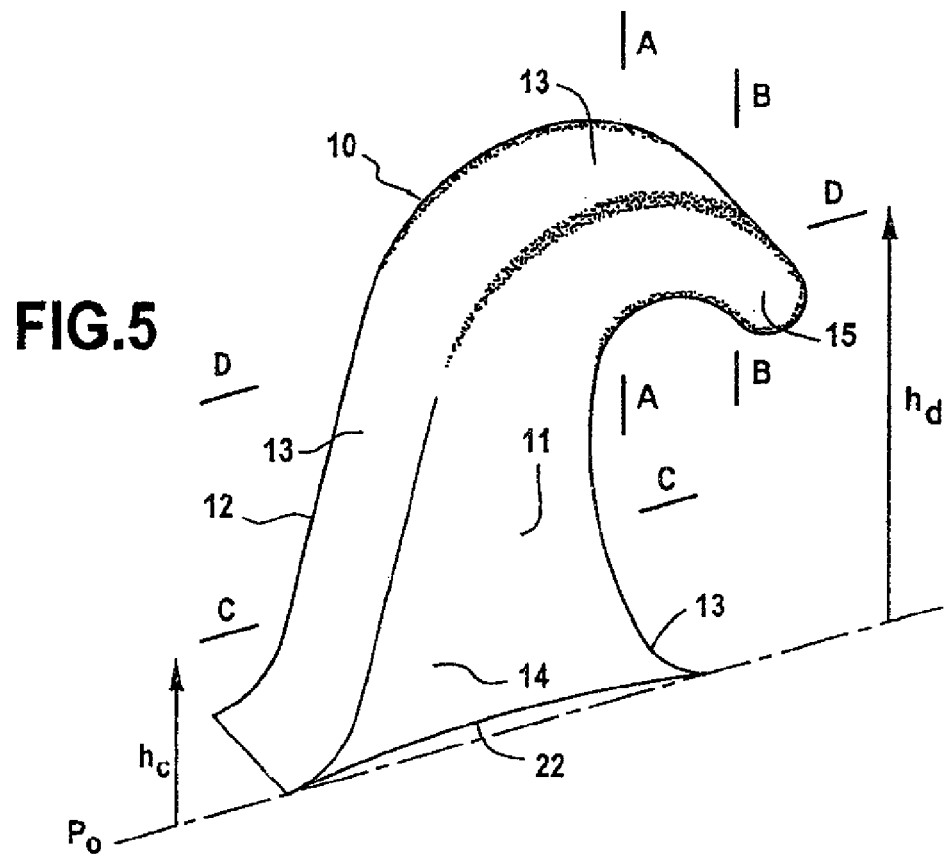
FIG. 5 shows a perspective view of a hook of a hook field obtained using a moulding insert in accordance with one embodiment of the invention.

FIGS. 5 and 6 show hooks as obtained in accordance with the invention. Each hook 10 is delimited by two lateral, substantially planar and parallel surfaces 11 and 12 and by an intermediate surface 13 adjoining the two surfaces 11 and 12. The intermediate surface 13 is delimited by the upper edges of the two planar surfaces, from the bottom of the hook on the right to the bottom of the hook on the left, passing through the tip thereof. The intermediate surface 13 forms the upper edge of the hook. These three surfaces thus delimit the hook which comprises a rod or base part 14 and a head part 15 protruding from the rod part. At the level of the lower part of the base or rod, the transition between each lateral surface and the intermediate surface is formed by a line such that the surfaces form an angle therebetween, in particular a right angle, whilst at the level of a part of the head, for example in the upper part, the transition between the lateral surfaces and the intermediate surface is smooth, i.e., curved. Thus, the shape of the cross-section of the hook at A-A of the head is itself formed, as shown in FIG. 6, of four straight lines 16 connected together by curved parts with large curvatures 17. Based on the location where the cross-section is taken, a cross-section which has all of its corners rounded, or only one or two or three of its corners, is possible.

The cross-section B-B of the hook of FIG. 5 and shown in FIG. 7 has the same type of shape as that of the cross-section A-A of FIG. 5, but the rounded corners 17' have a greater radius of curvature than that of the rounded corners 17 of FIG. 5.

The cross-section C-C at the level of the base, shown in FIG. 8, has sharp-edged, i.e., non-rounded, corners, forming a sort of turning point. However, the two curve sections 20 and 21 which correspond to the intersection between the respective lateral surfaces 11 and 12 and the plane parallel to the base plane P0 and to the distance he from this plane are curved having their concavity towards the exterior of the hook and opposed to each other.

Similarly, the cross-section at the level of the base plane, shown in FIG. 10, has sharp-edged, i.e., non-rounded, corners forming a sort of turning point. However, the two curve sections 22 and 23 which correspond to the intersection between the respective lateral surfaces 11 and 12 and the base plane P0 are curved, having their concavity towards the exterior of the hook and opposed to each other. The curvature or concavity of the section 22 is greater than that of the section 20 and that of the section 23 is greater than that of the section 21. Similarly, at the level of the head, the sections 24 and 25 corresponding to the cross-section along line D-D are substantially straight, their concavity thus being zero and therefore less that that of the sections 20 and 21.

The thickness e0 at the level of the base plane is less than the thickness at the level of the plane C-C which itself is less that the thickness eDD at the level hd of the plane D-D.

Figure 4:
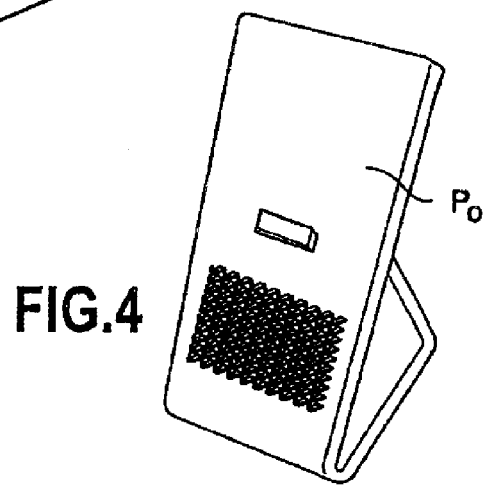
FIG. 4 shows a moulded object having a hook field, the moulded object and the hooks being in one piece and obtained by injection moulding in a mould in which the insertion block has been disposed beforehand to form the hook field.

In the hook field of the moulded object of FIG. 4, the hooks are arranged in rows and columns, which are in particular perpendicular to each other.

The thermoplastic moulding material can be selected from polyolefins, polyamides, TPEs, etc.

In the case of FIG. 5, the cavities of the corresponding insertion block have an opening towards the aeration channel which has a small cross-section, and in particular is only present on one side of the head. This results in some degree of braking for the material which is not able to perfectly fill the corners of the cavities, and thus in rounded shapes for the head at the corners of the cavity.

In contrast, as shown in FIG. 11, in the case where the opening has a larger cross-section and in particular extends over virtually all of the bottom of the head, the corners are well formed and the hook does not have a rounded shape, or only has a slight rounded shape.

In the case where the opening between the moulding cavity and the aeration channels is very large and where furthermore the viscosity of the material permits an extremely fluid flow, the thermoplastic material is able to surge into this opening and protrude into the channels. In such a case, and as shown in FIG. 12, the hook will comprise at the level of its head a development 40 created by this infiltration of the thermoplastic material in the passage opening towards the aeration channels of the moulding cavity. Often in this case, the transition between the lateral surfaces and the intermediate surface will be formed with a sharp edge or corner over the entire extent from left to right of the hook of the intermediate surface. The cross-section without a sharp edge or corner will be formed in particular at the level of the development.

To show the gradient of curvature of the lateral surface of the hook (i.e., that at the level of the head the curvature is virtually zero or at least less than the curvature at the level of the base of the hook, the following test can be used:

The hook field of the moulded object must be inclined by 15° with respect to the horizontal, the inclination being effected around an axis in parallel with the intersection of the transverse plane and of the base plane of a line of hooks.

The hooks must be observed using a microscope having a magnification of at least 150, for example the variable pressure, Hitachi S 3200N Scanning Electron Microscope, high vacuum observations and secondary electrons after Au/Pd metallization.

In order to be able to observe a hook in the middle of the hook field, the hooks surrounding it can be cut using a razor blade.

Cross-sections which are substantially rectangular are shown. However, they can also be simply substantially quadrilateral by cutting with the blades not at 90° with respect to the plane of the plates but sloping.

What is claimed is:

1. An insertion block intended to be disposed in a mould for forming an object to be moulded to form a hook field in one piece with the moulded object, comprising at least one first plate, having on its upper edge at least one cut-out having a shape complementary to a series of hooks and issuing out of the two opposite lateral surfaces of the plate and of its upper edge, and at least two second plates sandwiching the at least one first plate therebetween, to form a cavity having said shape complementary to said series of hooks, delimited by lateral walls formed by the two second plates and issuing out of the upper edge of the first plate via an opening, the plates being clamped together, characterized in that the plates are fixed to each other by a "diffusion bonding" process, and in that there is formed in at least one of the plates at least one auxiliary recess which is intended to form, when the plates are against each other, at least one aeration channel communicating on the one hand with at least one part of the at least one cavity and on the other hand with the exterior of the insertion block formed by the plates disposed one against the other, wherein the aeration channel (s) has/have a stepped cross-section formed by a first part having a small cross-section and a second part having a larger cross-section than the small cross-section, wherein the small cross-section is intended to effect the communication with the head part of the cavity having a shape complementary to the hooks such that air can pass into this cross-section but not thermoplastic material, and the large cross-section permits quick venting of the air which passes from the small cross-section into the large cross-section, itself in contact with the outside.

2. An insertion block intended to be disposed in a mould for forming an object to be moulded to form a hook field in one piece with the moulded object, comprising at least one first plate, having on its upper edge cut-outs having a shape complementary to a series of hooks and issuing out of the two opposite lateral surfaces of the plate and of its upper edge, and at least two second plates sandwiching the at least one first plate therebetween, to form a cavity having said shape complementary to said series of hooks, delimited by lateral walls formed by the two second plates and issuing out of the upper edge of the first plate via an opening, the plates being clamped together, characterized in that the plates are fixed to each other by a "diffusion bonding" process, and in that there is formed in at least one of the plates at least one auxiliary recess which is intended to form, when the plates are against each other, at least one aeration channel communicating on the one hand with at least one part of the at least one cavity and on the other hand with the exterior of the insertion block formed by the plates disposed one against the other, wherein the cross-section of the aeration channel(s) is flared, starting with a small dimension, in communication with the cavity, through which air can pass but not injected thermoplastic material and finishing with a large dimension permitting quick venting of the air.

3. An insertion block intended to be disposed in a mould for forming an object to be moulded to form a hook field in one piece with the moulded object, comprising at least one first plate, having on its upper edge at least one cut-out having a shape complementary to a series of hooks and issuing out of the two opposite lateral surfaces of the plate and of its upper edge, and at least two second plates sandwiching the at least one first plate therebetween, to form a cavity having said shape complementary to said series of hooks, delimited by lateral walls formed by the two second plates and issuing out of the upper edge of the first plate via an opening, the plates being clamped together, characterized in that the plates are fixed to each other by a "diffusion bonding" process, and in that there is formed in at least one of the plates at least one auxiliary recess which is intended to form, when the plates are against each other, at least one aeration channel communicating on the one hand with at least one part of the at least one cavity and on the other hand with the exterior of the insertion block formed by the plates disposed one against the other, wherein the at least one auxiliary recess is formed in the at least one first plate.

4. The insertion block as claimed in claim 1, wherein the second plates are plates without cut-outs.

5. An insertion block, intended to be disposed in a mould for forming an object to be moulded to form a hook field in one piece with the moulded object, comprising at least one first plate, having on its upper edge at least one cut-out having a shape complementary to a series of hooks and issuing out of the two opposite lateral surfaces of the plate and of its upper edge, and at least two second plates sandwiching the at least one first plate therebetween, to form a cavity having said shape complementary to said series of hooks, delimited by lateral walls formed by the two second plates and issuing out of the upper edge of the first plate via an opening, the plates being clamped together, characterized in that the plates are fixed to each other by a "diffusion bonding" process, and in that there is formed in at least one of the plates at least one auxiliary recess which is intended to form, when the plates are against each other, at least one aeration channel communicating on the one hand with at least one part of the at least one cavity and on the other hand with the exterior of the insertion block formed by the plates disposed one against the other, wherein the diameter of the equivalent cross-section of the opening for communication between the cavity and the aeration channel is between $1 \times 10^{-2}$ mm and $4 \times 10^{-2}$ mm.

6. The insertion block as claimed in claim 1, wherein the second plates have at their edge at least one second plate cut-out for forming a second series of hooks and when the second plates are disposed against the at least one first plate, the second plate cut-out forms a second plate cavity that is offset with respect to the cavity of the first plate, the first plate forming a wall for the second plate cavity and the second plates each forming a wall of the cavity of the first plate.

7. An insertion block, intended to be disposed in a mould for forming an object to be moulded to form a hook field in one piece with the moulded object, comprising at least one first plate, having on its upper edge at least one cut-out having a shape complementary to a series of hooks and issuing out of the two opposite lateral surfaces of the plate and of its upper edge, and at least two second plates sandwiching the at least one first plate therebetween, to form a cavity having said shape complementary to series of hooks, delimited by lateral walls formed by the two second plates and issuing out of the upper edge of the first plate via an opening, the plates being clamped together, characterized in that the plates are fixed to each other by a "diffusion bonding" process, and in that there is formed in at least one of the plates at least one auxiliary recess which is intended to form, when the plates are against each other, at least one aeration channel communicating on the one hand with at least one part of the cavity and on the other hand with the exterior of the insertion block formed by the plates disposed one against the other, wherein the pressure applied to the stacked plates during the diffusion bonding process is so high that the walls of the cavities formed in said plates are deformed.

8. The insertion block as claimed in claim 7, wherein the walls of the cavities have a camber which evens out the opening towards the bottom of the cavity.

* * * * *